United States Patent
Krum et al.

(10) Patent No.: US 6,307,706 B1
(45) Date of Patent: Oct. 23, 2001

(54) DISC ARRANGEMENT ON A HYDRODYNAMIC MOTOR

(75) Inventors: Richard Gene Krum, Edmond, OK (US); Michael Moir, Newbury Park, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/259,779

(22) Filed: Mar. 1, 1999

(51) Int. Cl.⁷ .................................................. G11B 17/08
(52) U.S. Cl. ...................................... 360/98.08; 360/99.12
(58) Field of Search ............................. 360/97.02, 98.08, 360/99.05, 99.12

(56) References Cited

U.S. PATENT DOCUMENTS 6,255,750 * 7/2001 Mohajerani ...................... 360/97.01

* cited by examiner

Primary Examiner—A. J. Heinz
(74) Attorney, Agent, or Firm—Merchant & Gould PC

(57) ABSTRACT

A method for storing and removing data storage discs from a disc drive assembly. Embodiments of the invention include determining the zero location, storing the discs to the disc drive and unpacking the discs from the disc drive, wherein the step of storing the discs includes locating the discs around a center disc by alternating between placing discs above and below the center disc, and wherein the step of unpacking the discs includes removing the discs around a center disc by alternating between placing discs above and below the center disc.

24 Claims, 7 Drawing Sheets

DISC ARRANGEMENT ON A HYDRODYNAMIC MOTOR

FIELD OF THE INVENTION

This invention is directed to a method for arranging, storing and removing discs from a head disc assembly; and in preferred embodiments, to a storage and retrieval method that facilitates the stability of the motor and minimizes gyration of the motor by centering the discs on the motor.

BACKGROUND ON THE INVENTION

Modern computers employ various forms of storage systems for storing programs and data. For example, various forms of disc drive systems have been designed to operate under the control of a computer to record information and/or retrieve recorded information on one or more recording discs. Such disc drives include hard disc drives which employ recording discs that have magnetizable (hard) recording material, optical disc drives which employ recording discs that have optically readable recording material, magneto-optical (MO) disc drives which employ recording discs that have optically readable magnetizable recording material, or the like.

Conventional disc drive systems typically include one or more recording discs supported for relatively high speed rotation on a rotary spindle. For example, FIG. 1 shows a side view of portions of a conventional disc drive system, including a conventional data storage or recording disc 200 supported on a spindle 210. A disc drive motor (not shown) is operatively coupled to the spindle 210 for rotation of the spindle and the disc supported thereon. A recording and/or reading head 220 is supported by suitable head support structure (not shown) adjacent the recording surface of the disc. To simplify the disclosure, FIG. 1 is shown with a single recording disc 200 having a single recording surface and a single head 220. However, other conventional disc drive systems employ multiple discs, double-sided discs (discs with recording surfaces on both surfaces) and multiple heads.

As shown in FIG. 1, the disc 200 has a central hub opening through which the spindle 210 extends. The disc 200 and spindle 210 are shown in a top view in FIG. 2. The spindle 210 extends through a central opening, which defines an inside diameter, of the disc. The disc is secured at its inner diameter (ID), in a fixed relation with the spindle 210, and is supported such that the outer diameter (OD) portion of the disc is free from contact with other components. In this regard, the disc is clamped at its ID to the spindle 210 and is free at its OD. When the spindle 210 is rotatably driven, the disc 200 is caused to rotate with the spindle 210. A top (not shown) which provides a protective cover for the disc is attached through the top of the spindle 210 and provides support for the spindle 210.

Typically, multiple center-open discs and spacer rings are alternately stacked on a spindle motor hub. The hub, defining the core of the stack, serves to align the discs and spacer rings around a common axis. Collectively the discs, spacer rings and spindle motor hub define a disc pack assembly.

The surfaces of the stacked discs are accessed by the read/write heads which are mounted on a complementary stack of actuator arms which form a part of an actuator assembly. Generally, the actuator assembly has an actuator body that pivots about a pivot mechanism disposed in a medial portion thereof. A motor selectively positions a proximal end of the actuator body. This positioning of the proximal end in cooperation with the pivot mechanism causes a distal end of the actuator body, which supports the read/write heads, to move radially across the recording surfaces of the discs, such that the head may be selectively positioned adjacent any recording location on the recording surface as the disc is rotated.

In operation, the head 220 is moved in the radial direction to align or register with a desired track location on the recording surface of the disc. Once aligned or registered with the desired track location, the head 220 is operated to read or write information onto the recording surface at the desired track location. It is important to properly register the head 220 with the track location to effect accurate reading or writing operations on the registered track.

Modern advances in disc drive technology have resulted in increased disc storage density and decreased track widths, such that greater amounts of information may be stored per given recording surface area. However, as track widths decrease (and storage density increases), the need for accurate head registration increases. In general, smaller track widths require greater head-to-track registration accuracies and have smaller alignment error tolerances. For example, for a disc with 393.7 tracks per cm (10,000 tracks per inch), the track width is only about 2540 $\mu$mm (100 $\mu$in) and the total allowable (tolerable) off-track mis-registration may be no more than about 254 $\mu$mm (10 $\mu$in) peak-to-peak.

Track mis-registration (TMR) may result from a variety of sources, including, for example, ball bearing non-repeatable run out, spindle-disc rocking vibrations and disc flutter. To reduce the asynchronous vibrations caused by ball bearing non-repeatable run out and spindle-disc rocking vibration, hydrodynamic motors have replaced the ball bearing motors previously used.

Although the introduction of the hydrodynamic motors reduced some vibration problems, it introduced other concerns. For instance, unlike ball-bearing motors, the hydrodynamic motors are not attached to the top cover by the central spindle. As such, the motor is susceptible to gyration due to uneven weight distribution introduced by the disc stack. Typically, the discs are stacked onto the hub in a linear manner from a specified zero location or predetermined start location, which does not change for different disc stack sizes. Thus, for instance, each disc stack might begin near the base of the hub, or the top of the hub. Each disc is stacked equidistant from each other. Thus, depending upon the number of discs, the height of discs along the hub will vary. As such, the weight distribution from the discs will vary depending upon the number of discs. However, most of the weight will be concentrated near the base or top of the hub, depending upon the zero location.

Further, depopping, which is the removal of one disc from the disc pack at a time, removes the discs from one end of the stack to the zero location. Thus, discs are removed, or depopped, from the top to the bottom or the bottom to the top of the hub.

This manner of depopping the discs enhances the uneven weight distribution. In a system utilizing a hydrodynamic motor, the uneven weight distribution causes the spindle, which is encased in a lubricating fluid, such as oil, to rise and fall and increases the likelihood that the spindle will hit the interior of the hub. The metal to metal contact can cause metal to be deposited into the oil. Due to the minute spacing between the spindle and the hub interior, the metal deposits can inhibit the spinning of the hub and cause the motor to freeze. Thus, there is a need in the industry for a method of arranging, storing and removing discs from a disc drive that does not increase the gyration of the motor.

SUMMARY OF THE DISCLOSURE

The instant invention is directed to a method for storing discs on a disc pack and removing discs from a disc pack assembly such that gyration of the motor is minimized. Preferred embodiments of the instant invention include determining a zero location, storing discs on a disc pack and removing discs from the disc pack.

Prior to the storage of the discs, a zero location, or initial location, is determined. The zero location is the location from which the reading and writing of all of the discs in the disc pack are referenced. The zero location is dependent, in part, upon the number of discs to be stored in the pack. Typically, the zero location is either the center of the hub of the motor, or close to the center position on the hub.

Once a zero location is determined, the center disc is located at the zero location. The next disc to be stored is placed either above or below the center disc at a specified distance, d. If the second disc were placed above the center disc, the third disc will be placed a distance d below the center disc. The fourth disc will then be placed a distance d above the second disc. The placement of subsequent discs is altered between the top and bottom of the disc pack, wherein the subsequently placed disc is placed a distance d from the outermost top or bottom disc. Placement of the discs continues until the number of desired discs are stored onto the disc pack.

The disc pack is ready for use and is written to or read from until such time that a user desires to remove some or all of the discs in the pack. Prior to removing any discs, the user ascertains the zero location. This is necessary as the disc at the zero location will be the last disc to be removed and thus, may dictate which disc to remove first.

Once the zero location is ascertained, the outermost top or bottom disc will be removed first. Typically, this is the same disc that was placed on the pack last. If the outermost top disc, for example, disc four from above, disc three, the outermost bottom disc will be removed next. Removal of the discs alternate between the top and bottom of the pack until the desired number of discs are removed.

A feature of preferred embodiments of this invention is that the zero location is substantially at the center of the hub. An advantage of this feature is that the discs are stored on the disc pack such that the weight of the discs is more evenly distributed. An even distribution of weight during spinning aids in the minimization of gyration of the motor which can cause damage due to metal to metal contact.

Another feature of preferred embodiments of this invention is that the discs are stored on the disc pack by alternating placement between the top most position and the bottom most position. An advantage to this feature is that the distribution of weight is maintained in a somewhat even manner so as to aid in stabilizing the motor as it is spinning.

Another feature of preferred embodiments of this invention is that the discs are removed from disc pack by alternating removal between the top most position and the bottom most position. An advantage to this feature is that a more even distribution of weight is maintained during the removal of discs so as to maintain the stability of the motor as it is spinning.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of preferred embodiments of the invention will be made with reference to the accompanying drawings, wherein like numerals designate corresponding parts in the figures.

DETAILED DESCRIPTION OF THE PREFERRED EMBODIMENTS

Figure 1:
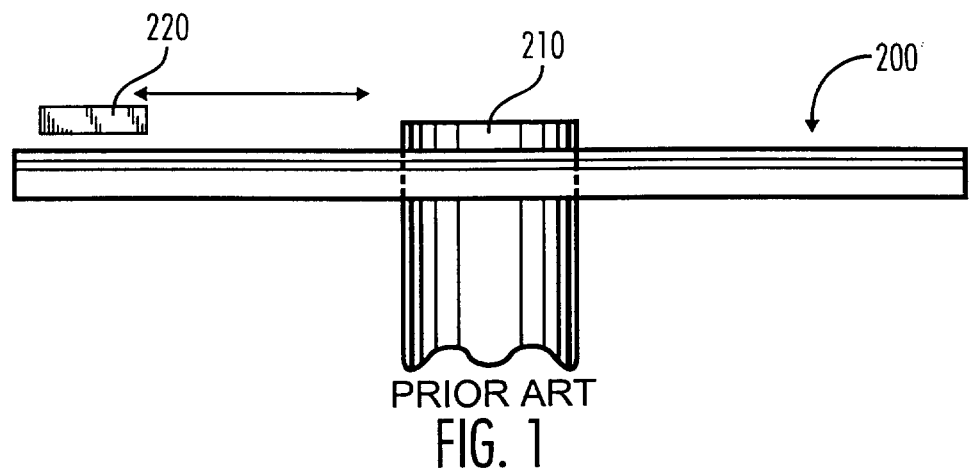
FIG. 1 is a side view of portions of a conventional disc drive system and recording disc.
Figure 2:
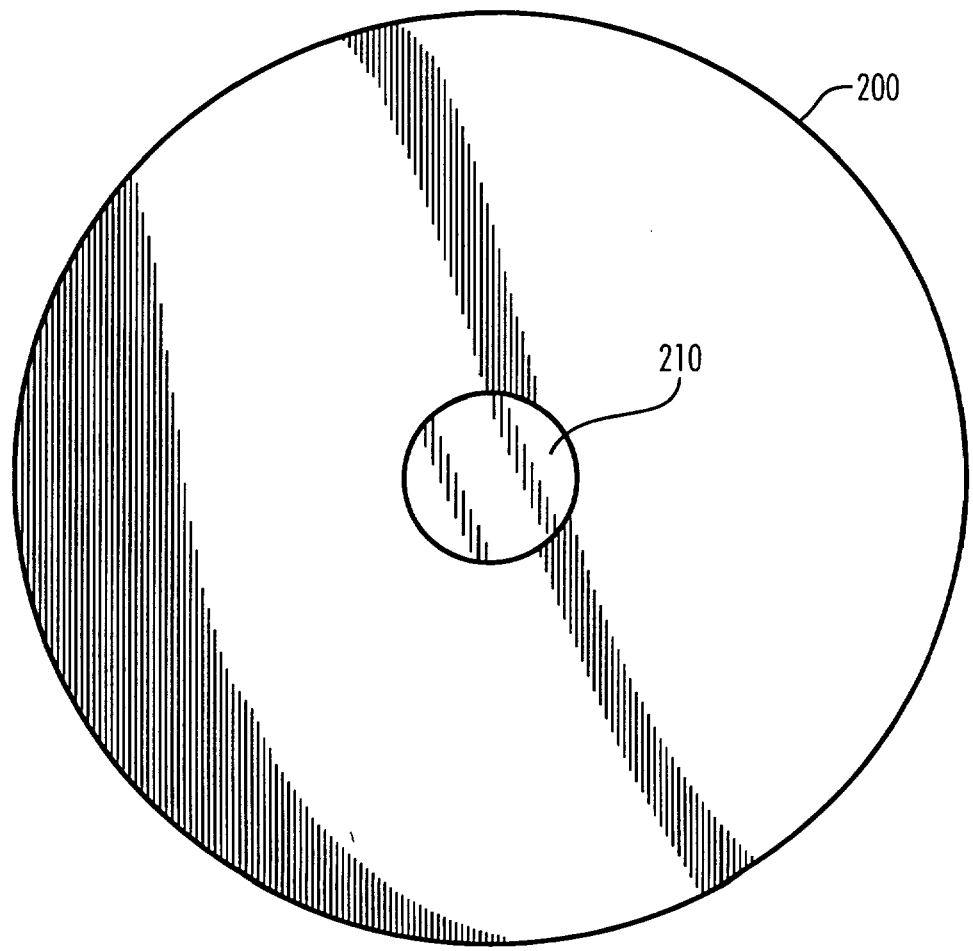
FIG. 2 is a top view of the recording disc and spindle of the system shown in FIG. 1.
Figure 3:
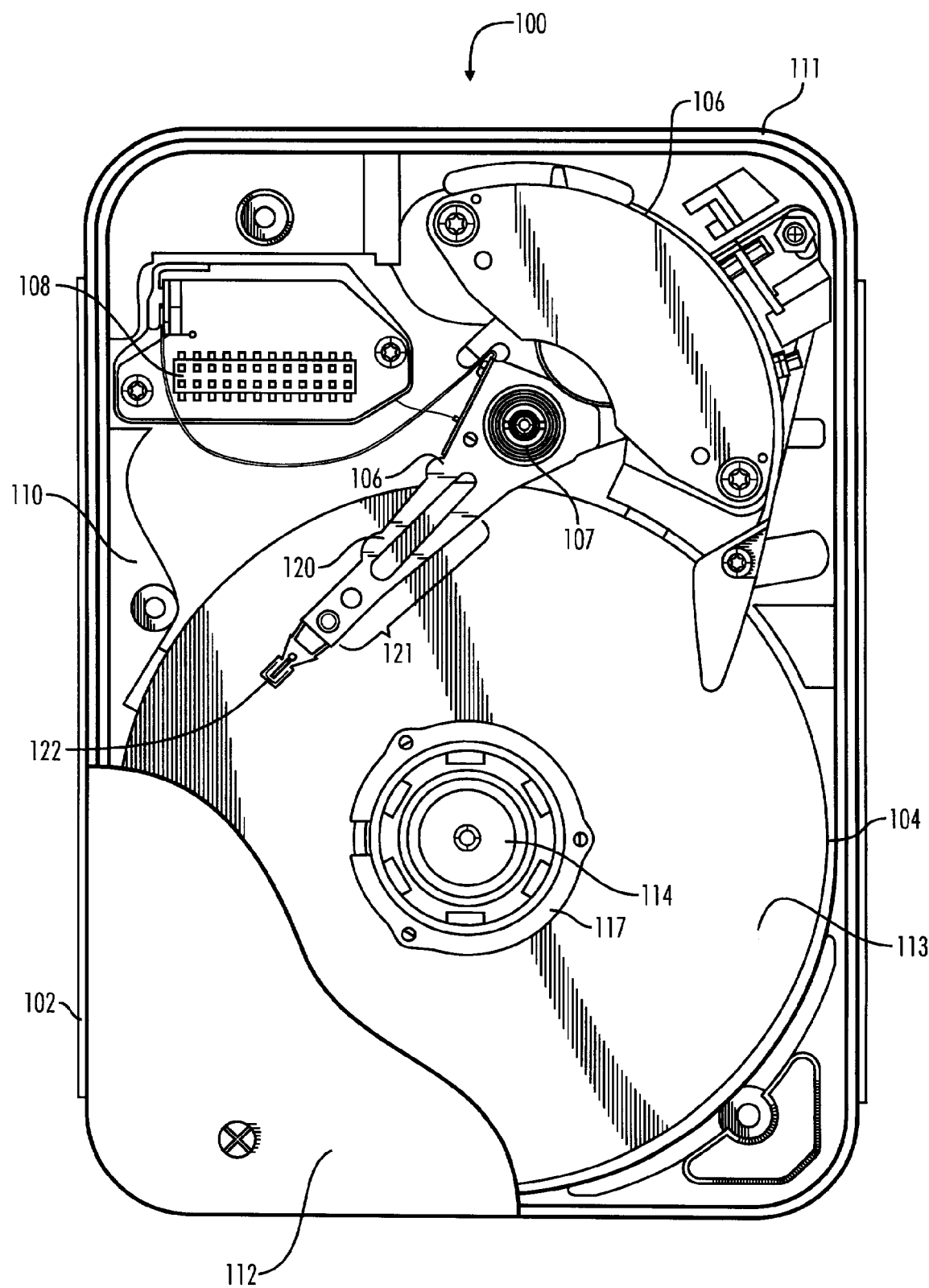
FIG. 3 is a top view of a preferred embodiment of a disc drive assembly.

FIG. 3 is a top view of a disc drive apparatus 100 including a disc arrangement according to a preferred embodiment of the instant invention. As shown in FIG. 3, the disc drive apparatus 100 includes a housing 102, at least one data storage disc 104, a head-arm assembly 106 which resides adjacent the data storage disc 104 and a controller 108 (partially shown). FIG. 3 is a top plan view of the disc drive apparatus 100, wherein a top portion of the apparatus 100 has been cut-away to expose a head-arm assembly 106 positioned over the data storage disc 104. It will be understood that numerous details of construction of the disc drive 100 are not included in the following description, as such, they are well known to those skilled in the art and are believed to be unnecessary for the purpose of describing the present invention.

The housing 102 includes a base 110 and a top 112, wherein the base 110 is configured to support the data storage disc 104 and the head-arm assembly 106. The top 112, coupled with the base 110 and a perimeter gasket 111, provide a sealed internal environment for the disc drive 100.

The data storage disc 104 includes a recording surface 113 defines, for example, concentric circular data tracks (not shown). The recording surface 113 is capable of receiving and/or storing information for later use.

A spindle motor 114, encased by a hub 115, is mounted to the base 110. The data storage discs 104, which are centered open discs, are mounted around the hub 115 and secured by a clamp ring 117 for rotation at a constant half speed. Indeed, the motor 114 spins, thereby rotating the disc 104 during use. Typically, the motor 114 is capable of spinning between 7200 to at least 20,000 rpms.

Adjacent the disc 104 is a head-arm assembly 106 which pivots on a pivot spindle assembly 107. The head-arm assembly 106 includes an arm 120, a suspension member 121 and a read/write head 122, wherein the head 122 is positioned over the data storage disc 104 at one end of the suspension member 121. The suspension member 121 can be moved across the recording surface 113 of the disc 104, thereby allowing the head 122 to be moved across the recording surface 113 such that the information on the disc 104 can be read.

Generally, a plurality of storage discs 104 are stacked on the motor 114 and there are a plurality of head-arm assemblies 106 coupled together in an E-block structure to access the discs 104 simultaneously, wherein each head-arm assembly 106 accesses one of two surfaces (top and bottom) of each disc 104.

The movement of the head-arm assembly 106 is controlled by the controller 108. The controller 108 is coupled to the base 110 and is in electronic communication with the components of the disc drive apparatus 100. The controller 108 is any means capable of controlling the components of the disc drive, such as, the motor 114 and the head-arm assembly 106. In one preferred embodiment, the controller is an integrated circuit board.

Figure 4:
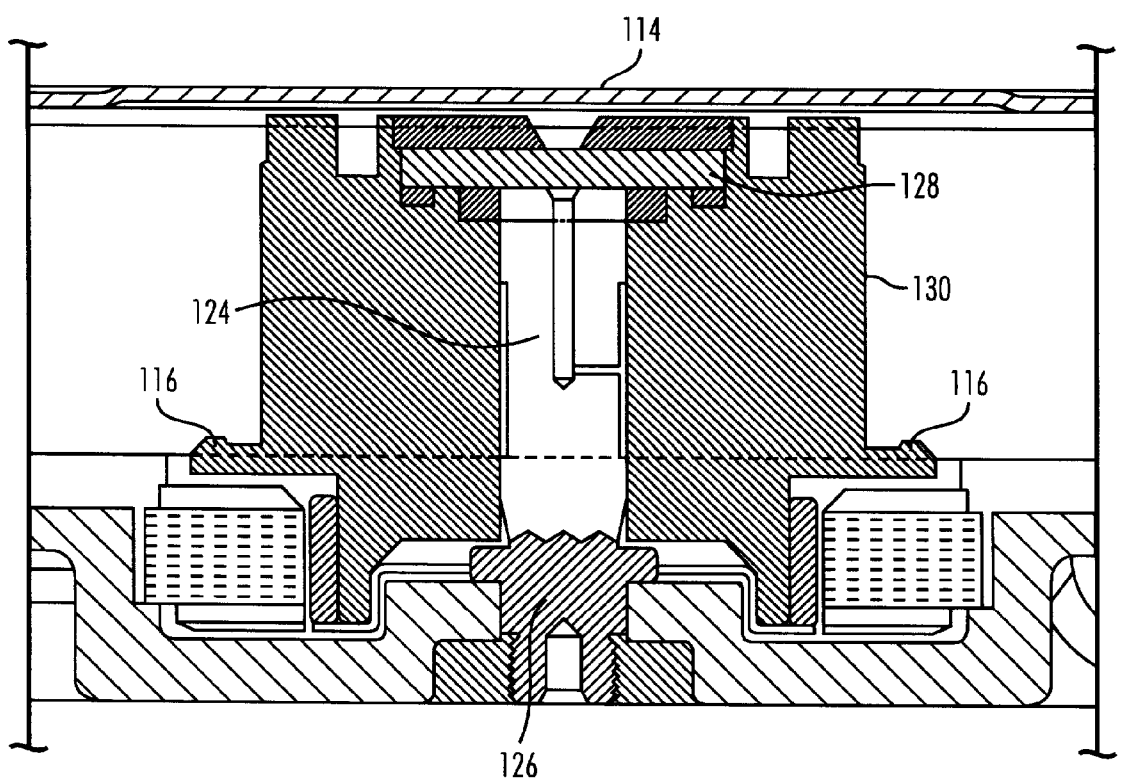
FIG. 4 is a cross section of the spindle and hub of the motor of the disc drive assembly of FIG. 3.

The instant invention is more specifically directed to a method for storing and retrieving data storage discs 104 to and from the motor 114 so as to minimize vibrations caused by gyrations of the motor 114. FIG. 4 depicts a preferred embodiment of a motor 114 used to drive the discs 104. The motor 114 includes a spindle 124, a mounting element 126, a thrust plate 128 and a hub 130.

Figure 5:
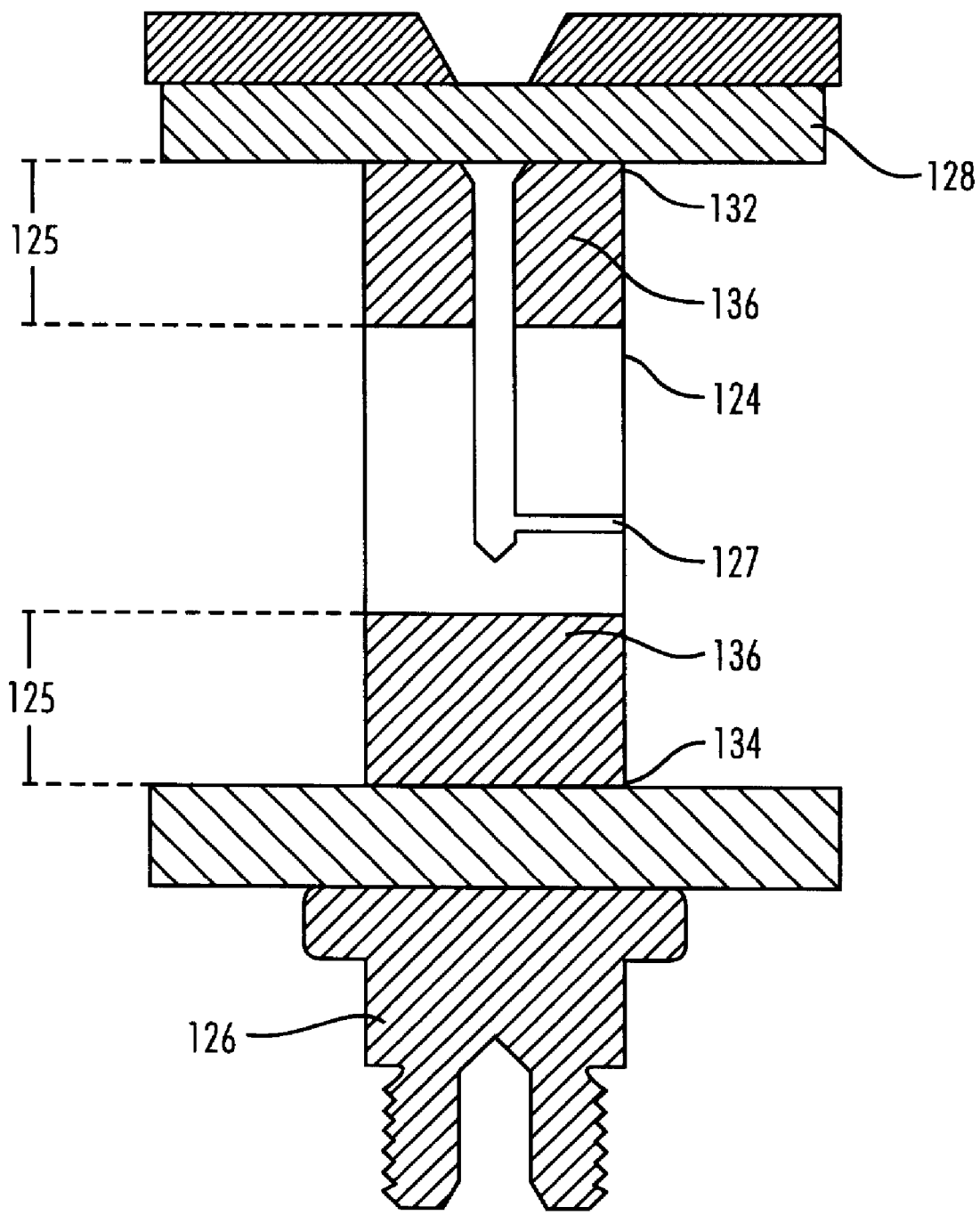
FIG. 5 is a cross section of the spindle of the motor in FIG. 3.

With reference to FIG. 5, the spindle 124 is a hollow cylindrical member and includes a top end 132, a bottom end 134 and a plurality of radial bearings 136. The radial bearings 136 are polished raised surfaces which are disposed at the top end 132 and bottom end 134 of the spindle 124. The radial bearings 136 extend along the spindle 124 a specified length 125 and around the circumference of the spindle 124. The bearings 136 are each of a uniform thickness.

The spindle 124 further includes an aperture 127 disposed between the radial bearings 136, wherein the aperture 125 is in fluid communication with the hollow interior of the spindle 124.

The mounting element 126 is a threaded member that is disposed adjacent the bottom end 134 of the spindle 124. The mounting element 126 mates with the base 110 (see FIG. 4) such that the spindle 124 is securely attached to the base 110. The mounting element 126 is not limited to a threaded device, but rather, can be any means capable of securing the spindle 124 to the base 110, such as, for example, a hook, glue, soldering or welding.

The thrust plate 128 is disposed adjacent the top end 130 of the spindle 124.

With reference to FIG. 4, the hub 130 is the outer casing for the motor 114 and surrounds the spindle 124. The hub 130 includes a flange 116 and a partially hollow interior for receiving the spindle 124. The flange 116 is annular and extends around the circumference of the hub 130. When the motor 116 is mounted into the base 110, the flange 116 rests on the base 110 and aids in stabilizing the motor 114.

During the spinning of the hub 130, the radial bearings 136 rub the hollow interior of the hub 130 and create radial stiffness in the motor 114. The portion of the spindle 124 between the radial bearings 136 are not raised and therefore do not contact the interior of the hub 130. The size of the radial bearings 136 are related, in part, to the amount of radial stiffness desired to be achieved. Indeed, the longer the length 125 of the radial bearings, the greater the surface area of the spindle 124 that contacts the interior of the hub 130 during spinning. The more surface area of the spindle 124 that is raised, and therefore contacts the interior of the hub 130, the more energy is required to spin the hub 130 due to the increase in friction.

When the motor is spinning, lubricating fluid, such as, for example, oil, is inserted into the aperture 127. The oil enters the interior of the hub 130 and flows upwards towards the top end 132. The oil travels between the top end 132 and the thrust plate 128. The oil then travels back down between the spindle 124 and the interior of the hub 130. The oil recycles into the aperture 127 and reenters the interior of the spindle 124. The oil cools as it travels through the interior of the spindle 124 and aids in cooling the motor 114.

As discussed above, hydrodynamic motors are not secured to the top of the disc pack assembly at the top of the spindle. Thus, the possibility of vibration due to gyration of the motor increases with this arrangement. Increased gyration of the motor 114 allows the metal of the spindle 124 to strike the metal of the hub 130 and deposit metal debris into the oil. The metal debris can then travel between the minute spacing between the spindle 124 and the interior of the hub 130 which can ultimately cause the motor 114 to freeze.

Figure 6:
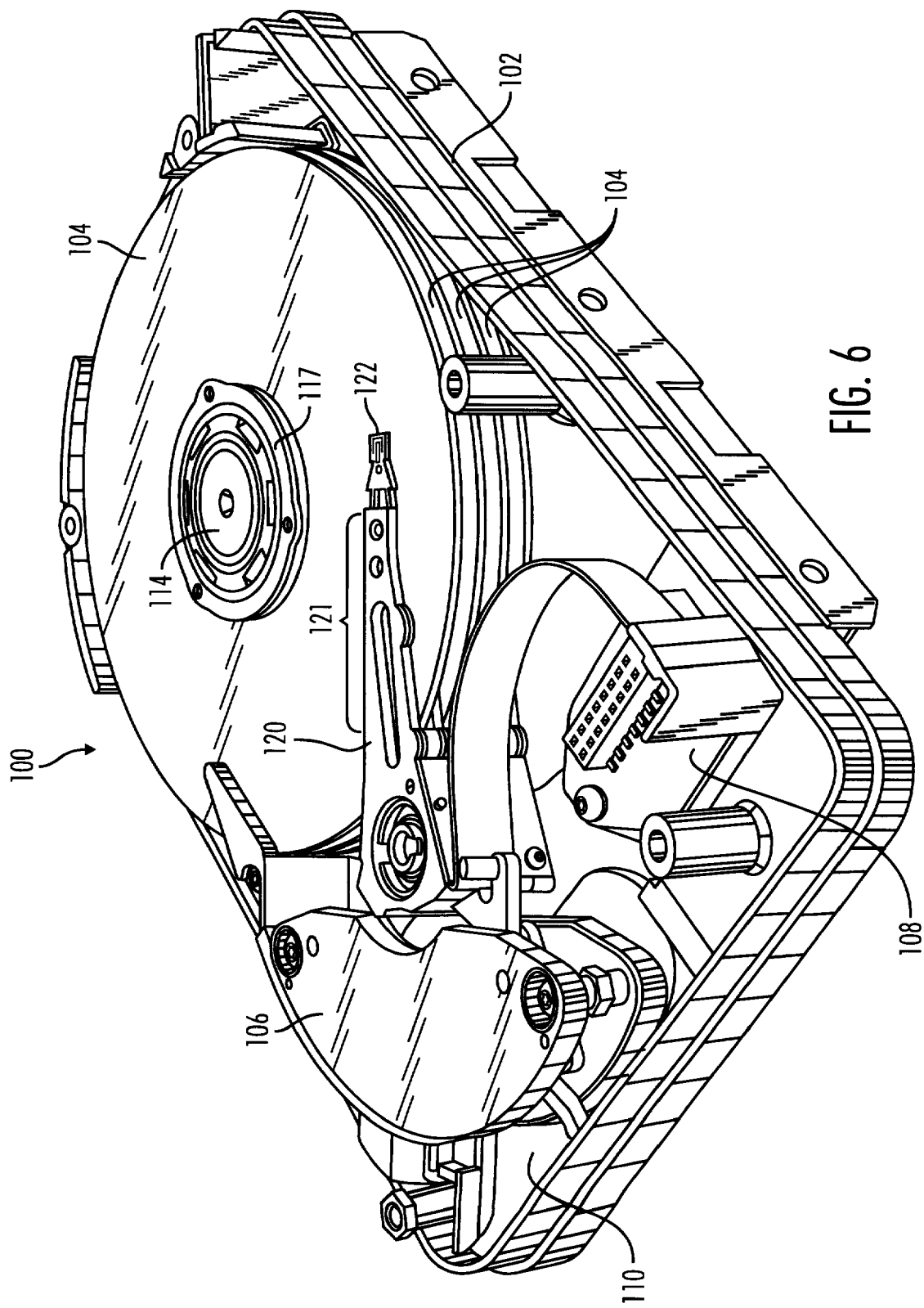
FIG. 6 is a three dimensional perspective of a preferred embodiment of a stacked disc drive pack.

To aid in preventing or minimizing vibrations caused by the gyration of the motor 114 from occurring, a preferred method for storing and retrieving data storage discs 104 centers the discs on the hub 130 to stabilize the weight distribution as the discs are spinning. FIG. 6 depicts a preferred embodiment of a disc arrangement. In one preferred embodiment, a method for sequencing the placement and removal of discs to and from a disc pack assembly includes the steps of locating a zero location 138, storing the discs to the disc pack assembly and unpacking the discs from the disc pack assembly.

The step of locating a zero location 138 includes assessing the number of discs to be packed on the assembly. Once the number of discs to be packed are determined, a zero location, or reference location 138, is determined. The zero location 138 is the location from which the reading and writing of all discs in the disc pack are referenced. The zero location 38 is dependent, in part, on the number of discs to be packed as each of the discs are placed equidistant from each other on the hub 130. Placing the discs equidistant from each other referenced from a central disc placed at or near the center of the hub 130 aids in maintaining the even distribution of weight on the hub 130 as the discs are spinning.

Figure 7:
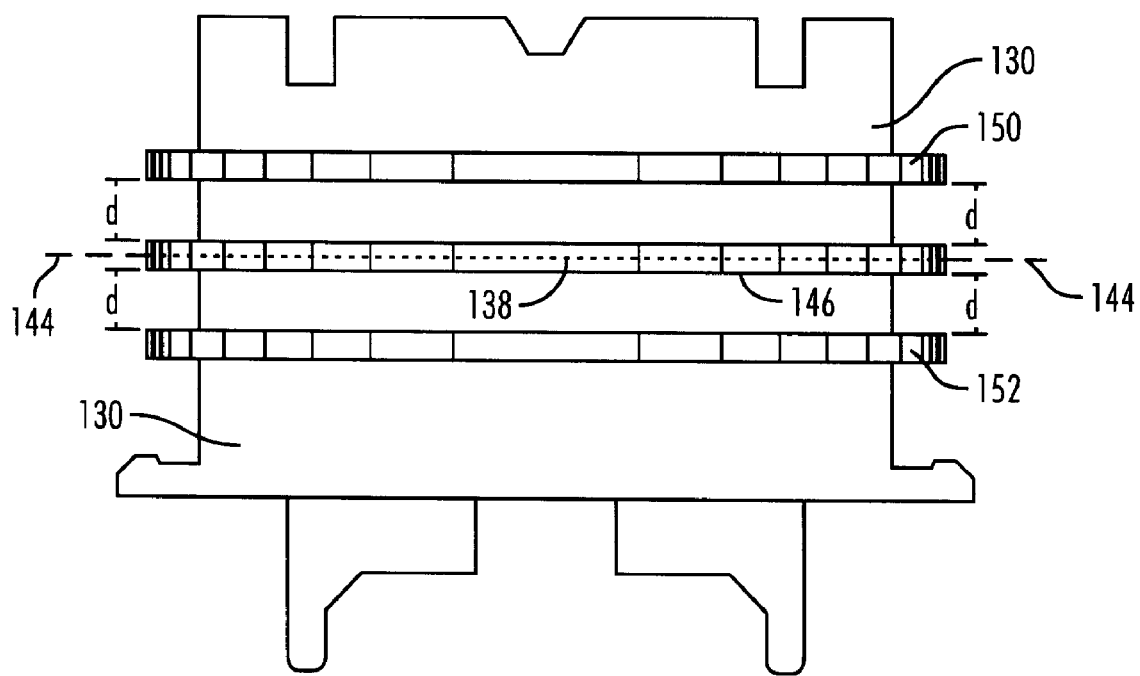
FIG. 7 is a side view of a preferred embodiment of a three-pack disc stack.
Figure 8:
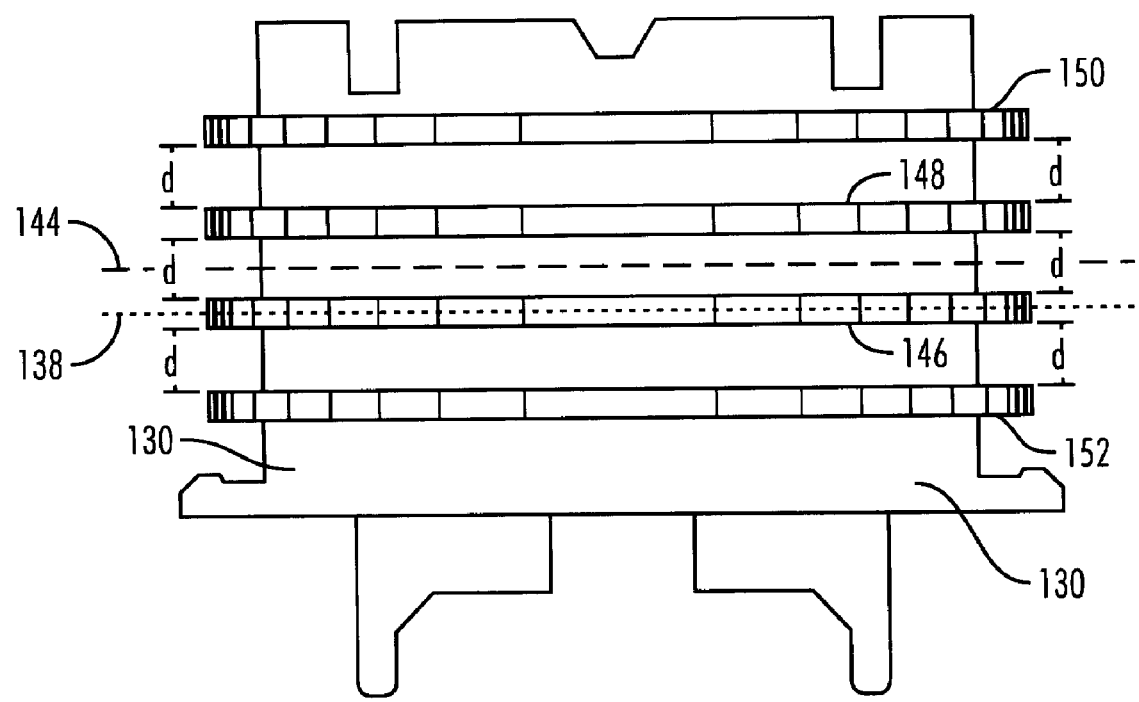
FIG. 8 is a side view of a preferred embodiment of a four-pack disc stack.

The zero location 138 is generally the center location 144, or substantially center location, on the hub 130. With reference to FIG. 7, in preferred embodiments wherein the number of discs to be packed are odd, the zero location 138 is the approximate center position 144 of the hub 130. In preferred embodiments wherein the number of discs is even, as shown in FIG. 8, the zero location 138 is close to the center of the hub 130. However, in these embodiments, the zero location 138 is offset from the center position 144 as the discs, as a pack, are located to centralize the weight on the hub 130.

Once the zero location 138 is determined, the discs are stored 140 on the disc pack assembly. Initially, the center disc 146 is placed at the zero location 138. After the center disc 146 is located, with reference to FIGS. 7 and 8, the remaining discs are placed on either side of the center disc 146 each at a distance d from each other. As such, the distribution of weight is approximately centralized on the hub 130 despite the number of discs in the pack.

After the disc pack assembly is loaded with discs, it is available for operation. The discs can now be written to or read from utilizing the servo-writer and head, respectively.

When the user desires to unpack or depop the disc pack assembly consideration must again be given to the ascertainment of the zero location 138, as the packing of the disc did not necessarily occur within a short time frame nor was it necessarily performed by the person unpacking the disc pack. Once the zero location 138 is ascertained, one of the outermost discs are removed from pack. In one preferred embodiment, depopping begins with the outermost top disc 150. In another preferred embodiment, depopping begins with the outermost bottom disc 152. Assuming that the outermost top disc 150, was initially removed, the next disc to be removed is the outermost bottom disc 152. Depopping of the discs continues by alternating between the top and the bottom of the pack until the desired number of discs are removed. Removal of the discs in this manner minimizes uneven weight distribution along the hub 130, thereby decreasing gyration of the motor when it is spinning. In this manner, the hub 130 and disc pack 104 can be reconfigured to support the desired number of discs suitable for the desired application and maintain the balance on the hub 130 such that motor gyration is not increased.

To illustrate by example, reference is made to FIG. 8 and a four-pack system. In a four-pack disc system, the center disc 146 will not necessarily reside at the center position 144 of the hub 130. Indeed, due to the even number of discs, the pack as a whole must be offset in order to centralize the weight of the disc pack.

A zero location 138 is determined to be slightly below the center position 144. The center disc 146 is located at the zero location 138. Since the zero location 138 is slightly below the center position 144 the second disc 148 is placed a distance d above the center disc 146. It is to be appreciated that the center position 144 could also be slightly above the center position 144 and the disc packing would simply be opposite to that described above. That is, the second disc 148 would be placed below the center disc 146. The distance between the discs, d, is a constant as the servo-writer must be able to consistently move between the discs without contacting the discs.

Once the second disc 148 is placed, disc three 152, also the bottom most disc, is placed a distance d below the center disc 146. Next, disc four 150, also the top most disc, is placed a distance d above the second disc 148. If more discs were to be packed, this procedure would continue until all of the desired discs were packed.

To unpack, or depop, the discs, the zero location is determined. As stated above, it is necessary to determine the zero location as it is the reference disc for reading and writing the disc pack and thus, will be unpacked last. Typically, the discs will be unpacked opposite to the manner in which they were stored. Thus, in this instance, depopping of the discs will occur as follows: disc four 150, disc three 152, disc two 148 and the center disc 146. It is to be appreciated that the user need not unpack all of the discs, but rather, could, for example, only unpack disc four 150 and replace it with a new disc.

It is to be appreciated that embodiments of this invention do not necessarily include all aspects of packing a disc pack and removing discs from a disc pack assembly. For instance, some embodiments only include the step of removing the discs from the disc pack assembly. In another preferred embodiment, only the steps of locating a zero location and storing the discs are included. Additionally, these steps may be performed opposite to that previously discussed. For instance, a user might first remove the discs from the disc pack and then store new discs on the disc pack assembly.

Therefore, based on the above, a method for storing storage data discs on a motor in a multi-pack head disc assembly, according to a preferred embodiment of the invention comprises determining the number of discs to be stored and determining an amount of spacing to be placed between the discs during storage. In addition, the method comprises locating a zero disc location on the motor and storing a first disc at the zero disc location. The method further comprises storing a second disc at the predetermined spacing above the first disc and storing a third disc at the predetermined spacing below the first disc.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive assembly while maintaining substantially the same functionality without department from the scope and spirit of the present invention. In addition, although the preferred embodiment described herein is directed to a method for arranging, storing and unpacking a disc drive system, it will be appreciated by those skilled in the art that the teachings of the present invention can be applied to other systems without departing from the scope and spirit of the present invention.

What is claimed is:

1. A method of populating a hub of a disc drive spindle motor with a disc stack having an odd number of data storage discs, the method occurring prior to assembly of the disc stack and comprising steps of:
   (a) determining a center position of the hub;
   (b) determining a position of a first disc to be substantially at the center position of the hub;
   (c) arranging the position of additional pairs of discs on the hub so that each additional pair includes a top disc positioned above the first disc and a bottom disc positioned below the first disc, the top and bottom discs each positioned substantially equidistant from the first disc, and each disc spaced from each adjacent disc by a predetermined distance;
   (d) determining a maximum number of discs that can fit on the hub given the position of the first disc and the predetermined spacing between adjacent discs; and
   (e) repeating the arranging step (c) until the maximum number of discs is reached.

2. A method as recited in claim 1, further comprising a step (f) of:
   (f) assembling a disc stack having the maximum number of discs, where individual discs are stacked on the hub from a bottom disc to a top disc and are positioned within the disc stack as determined in steps (a) through (e).

3. A method as recited in claim 1, further comprising a step (f) of:
   (f) depopulating the disc drive hub by removing a pair of discs comprising a topmost disc and a bottommost disc from the disc stack.

4. A method as recited in claim 3, further comprising step (g) of:
   (g) assembling a disc stack having a number of discs equal to the maximum number of discs minus two, where individual discs are stacked on the hub from a bottom disc to a top disc and are positioned within the disc stack as determined in steps (a) through (f).

5. A method as recited in claim 3 further comprising a step (g) of:

(g) repeating the depopulating step (f) to depopulate additional pairs of topmost and bottommost discs until a desired storage capacity is attained.

6. A method as recited in claim 5, further comprising a step (h) of:

(h) assembling a disc stack having the desired storage capacity, where individual discs are stacked on the hub from a bottom disc to a top disc and are positioned in the disc stack as determined in steps (a) through (g).

7. A method of populating a hub of a disc drive spindle motor with a disc stack having an even number of data storage discs, the method occurring prior to assembly of the disc stack and comprising steps of:

(a) determining a center position of the hub;

(b) determining a position of a first disc to be below the center position of the hub;

(c) determining a position of a second disc to be above the center position of the hub, the second disc spaced from the first disc by a predetermined distance, and the first and second discs positioned substantially equidistant from the center position of the hub;

(d) arranging the position of additional pairs of discs on the hub so that each additional pair includes a bottom disc positioned below the first disc and a top disc positioned above the second disc, the top and bottom discs each positioned substantially equidistant from the central position of the hub, and each disc spaced from each adjacent disc by a predetermined distance;

(e) determining a maximum number of discs that can fit on the hub given the positions of the first and second discs and the predetermined spacing between adjacent discs; and (f) repeating the arranging step (d) until the maximum number of discs is reached.

8. A method as recited in claim 7, further comprising a step (g) of:

(g) assembling a disc stack having the maximum number of discs, where individual discs are stacked on the hub from a bottom disc to a top disc and are positioned within the disc stack as determined in steps (a) through (f).

9. A method as recited in claim 7, further comprising a step (g) of:

(g) depopulating the disc drive hub by removing a pair of discs comprising a topmost disc and a bottommost disc from the disc stack.

10. A method as recited in claim 9, further comprising a step (h) of:

(h) assembling a disc stack having a number of discs equal to the maximum number of discs minus two, where individual discs are stacked on the hub from a bottom disc to a top disc and are positioned within the disc stack as determined in steps (a) through (g).

11. A method as recited in claim 9 further comprising a step (h) of:

(h) repeating the depopulating step (g) to depopulate additional pairs of topmost and bottommost discs until a desired storage capacity is attained.

12. A method as recited in claim 11, further comprising step (i) of:

(i) assembling a disc stack having the desired storage capacity, where individual discs are stacked on the hub from a bottom disc to a top disc and are positioned in the disc stack as determined in steps (a) through (h).

13. A method of depopulating a disc stack of a disc drive spindle motor so that the disc stack includes a desired number of data storage discs, the method occurring prior to assembly of the disc stack and comprising steps of:

(a) vertically centering the disc stack about a center position of a hub of the spindle motor; and (b) removing one of a topmost disc and a bottommost disc from the disc stack.

14. A method as recited in claim 13, further comprising a step (c) of:

(c) removing the other of the topmost disc and the bottommost disc from the disc stack.

15. A method as recited in claim 14, further comprising step (d) of:

(d) alternately repeating steps (b) and (c) as necessary to obtain the desired number of data storage discs within the disc stack.

16. A method as recited in claim 15, further comprising a step (e) of:

(e) assembling a disc stack having the desired number of data storage discs, where individual discs are stacked on the hub from a bottom disc to a top disc and are positioned in the disc stack as determined in steps (a) through (d).

17. A disc drive comprising:

a spindle having hydrodynamic bearings;

a cylindrical hub surrounding the spindle and engaging the hydrodynamic bearings to allow rotation of the hub about the spindle, the hub having a center position defined along a vertical dimension of the hub; and a stack of storage discs attached to the hub, each storage disc spaced apart from each adjacent storage disc by a predetermined distance, the stack of storage discs defining a center point that is positioned substantially at the center position of the hub.

18. A disc drive as defined in claim 17 wherein a maximum number of storage discs that can fit on the hub is determined from a vertical length of the hub, the center position of the hub and the predetermined spacing between adjacent storage discs.

19. A disc drive as defined in claim 18 wherein:

the maximum number of storage discs is an odd number; and a middle disc of the disc stack is positioned substantially at the center position of the hub.

20. A disc drive as defined in claim 19 wherein:

at least one pair of discs comprising a topmost disc and a bottommost disc is depopulated from the stack prior to assembly of the disc drive.

21. A disc drive as defined in claim 18 wherein:

the maximum number of storage discs is an even number; and a middle pair of discs in the disc stack is substantially centered about the center position of the hub and positioned so that a top disc of the middle pair is above the center position of the hub and a bottom disc of the middle pair is below the center position of the hub.

22. A disc drive as defined in claim 21 wherein:

at least one pair of discs comprising a topmost disc and a bottommost disc is depopulated from the stack prior to assembly of the disc drive.

23. A disc drive as defined in claim 18 wherein:

one of a topmost disc and a bottommost disc is depopulated from the stack prior to assembly of the disc drive.

24. A disc drive as defined in claim 23 wherein:

the other of the topmost disc and the bottommost disc is depopulated from the disc stack.

* * * * *